(12) United States Patent
Lister et al.

(10) Patent No.: US 12,252,420 B2
(45) Date of Patent: Mar. 18, 2025

(54) METHODS OF REMOVING CONTAMINANTS FROM A SOLUTION, AND RELATED SYSTEMS

(71) Applicants: Battelle Energy Alliance, LLC, Idaho Falls, ID (US); Boise State University, Boise, ID (US)

(72) Inventors: Tedd E. Lister, Bangor, ME (US); Luis A. Diaz Aldana, Idaho Falls, ID (US); Naqsh E. Mansoor, Boise, ID (US); David Estrada, Boise, ID (US)

(73) Assignees: Battelle Energy Alliance, LLC, Idaho Falls, ID (US); Boise State University, Boise, ID (US)

( * ) Notice: Subject to any disclaimer, the term of this patent is extended or adjusted under 35 U.S.C. 154(b) by 868 days.

(21) Appl. No.: 17/110,487

(22) Filed: Dec. 3, 2020

(65) Prior Publication Data
US 2021/0171369 A1 Jun. 10, 2021

Related U.S. Application Data

(60) Provisional application No. 62/944,176, filed on Dec. 5, 2019.

(51) Int. Cl.
*C02F 1/469* (2023.01)
*C02F 1/46* (2023.01)
(Continued)

(52) U.S. Cl.
CPC .......... *C02F 1/4691* (2013.01); *C02F 1/4604* (2013.01); *C02F 1/46114* (2013.01);
(Continued)

(58) Field of Classification Search
CPC .. C02F 1/4691; C02F 1/4604; C02F 1/46114; C02F 2001/46133; C02F 2101/16;
(Continued)

(56) References Cited

U.S. PATENT DOCUMENTS 6,156,186 A * 12/2000 Mueller .................... C22B 3/26
205/582
2015/0315043 A1* 11/2015 Servida ............... C02F 1/46114
204/632

(Continued)

FOREIGN PATENT DOCUMENTS

WO 2018106186 A1 6/2018
WO WO-2018205290 A1 * 11/2018 ........... B01D 61/027

OTHER PUBLICATIONS

Gendel, Youri; Batch mode and continuous desalination of water using flowing carbon deionization (FCDI) technology; Electrochemistry Communications (Year: 2014).*

(Continued)

*Primary Examiner* — Ekandra S. Miller-Cruz
(74) *Attorney, Agent, or Firm* — TraskBritt (57) ABSTRACT

A method of removing contaminants from a solution comprises passing a solution including one or more contaminants through a first cell comprising a first anode chamber and a first cathode chamber, passing a slurry comprising a flowing electrode material through the first anode chamber and the first cathode chamber while applying an electric potential between the first anode chamber and the first cathode chamber to transport anions from the solution to the first anode chamber and to transport cations from the solution to the first cathode chamber, the flowing electrode material comprising a MXene material, wherein M is a metal and X is one or both of carbon and nitrogen, and passing the slurry through a second cell to desorb the anions and cations from the flowing electrode material. Related systems for removing contaminants from a solution, and related methods are disclosed.

16 Claims, 3 Drawing Sheets

(51) Int. Cl.
  *C02F 1/461* (2023.01)
  *C02F 101/16* (2006.01)
  *C02F 103/08* (2006.01)

(52) U.S. Cl.
  CPC .......... *C02F 2001/46133* (2013.01); *C02F 2101/16* (2013.01); *C02F 2103/08* (2013.01); *C02F 2209/40* (2013.01); *C02F 2301/04* (2013.01)

(58) Field of Classification Search
  CPC .............. C02F 2103/08; C02F 2209/40; C02F 2301/04; C02F 2101/20; C02F 2303/16
  USPC .................................................. 210/748.01
  See application file for complete search history.

(56) References Cited

U.S. PATENT DOCUMENTS

2019/0152811 A1* 5/2019 Cohen ............... H01M 4/02
2019/0344222 A1* 11/2019 Han .................. B01D 71/05

OTHER PUBLICATIONS

Definition of Layered Structures (Year: 2024).*
Aftab, Two-dimensional MXene incorporating for electron and hole transport in high-performance perovskite solar cells, Materials Today Energy (Year: 2023).*
Cho et al., "Flow-electrode capacitive deionization with highly enhanced salt removal performance utilizing high-aspect ratio functionalized carbon nanotubes", Water Research 151 (2019), pp. 252-259.
Ma et al., "Energy recovery from the flow-electrode capacitive deionization", Jounral of Power Sources 421 (2019), pp. 50-55.
Yang et al., "Flow-Electrode Capacitive Deionization Using an Aqueous Electrolyte with a High Salt Concentration", ACS Publications, Environ. Sci. Technol. 2016, 50, pp. 2892-5899.

* cited by examiner

METHODS OF REMOVING CONTAMINANTS FROM A SOLUTION, AND RELATED SYSTEMS

CROSS-REFERENCE TO RELATED APPLICATION

This application claims the benefit under 35 U.S.C. § 119(e) of U.S. Provisional Patent Application Ser. No. 62/944,176, filed Dec. 5, 2019, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the disclosure relate generally to systems and methods of removing contaminants from a solution. More particularly, embodiments of the disclosure relate to methods of removing contaminants, such as ammonia, from a solution, such as wastewater, brine, or seawater, using a flowing electrode capacitive deionization system, and to related systems for removing the contaminants from a solution.

BACKGROUND

As the global population continues to increase and as human activity continues to emit pollution that affects water quality across the globe, the shortage of freshwater is an ever increasing concern. One mode of generating freshwater is the desalination of seawater or other brackish salt-containing water. Current methods of water desalination include, among other methods, distillation, reverse osmosis, electrodialysis, stripping, and membrane purification. Due to the large volumes of water that are generally desired, low cost and low capital expense for water purification are of importance.

In addition to salt, water may be contaminated with other materials, such as ammonia, heavy metals, and other contaminants. For example, wastewater treatment facilities, steel production facilities, and industrial wastewaters, such as wastewater from oil refineries and sludge digesters, include water streams that are contaminated with ammonia. Other sources of contaminated water include agricultural runoff, which may be contaminated with ammonia absorbed from fertilizers. Other sources of ammonia contamination in water include landfill leachate. Methods of removing ammonia from wastewater include, among other methods, anaerobic-aerobic treatment of ammonia, biological nitrification and denitrification processes, chemical precipitation, ammonia stripping, evaporation of ammonia, and electrodeionization (EDI). However, methods of anaerobic-aerobic treatment of ammonia and ammonia stripping processes require significant amounts of energy. In addition, anaerobic methods of ammonia removal may only be suitable for effluents with low ammonia concentrations and often require addition of external carbon sources, such as when the ammonia containing-wastewater has a low ratio of chemical oxygen demand to nitrogen content (COD/N). Biological nitrification processes are slow and do not facilitate the recovery of the embedded ammonia.

Other methods of removal of contaminants from water include capacitive deionization (CDI). In the CDI process, solutions to be purified are passed through a cell that includes stationary electrodes configured to adsorb ions from the solution by the application of an electric potential between the stationary electrodes. Electrode materials for CDI systems include carbon-based materials, such as activated carbon, carbon aerogels, mesoporous carbon, and graphene. The electrode materials are generally coated over a substrate. Once the electrodes become saturated with ions from the solution, the ionic impurities adsorbed onto the electrodes must be stripped from the electrodes. This is generally accomplished by flushing the electrodes with a stripping solution and reversing the polarity of the CDI cell, which reverses the ionic flow (pushes the adsorbed ions away from the electrode surfaces) and displaces the adsorbed ions. However, changing the solution in the CDI cell may lead to cross contamination between the solution from which impurities are to be removed and the stripping solution. In addition, switching between the solution to be purified and the stripping solution reduces the throughput of the CDI cell since the adsorption of the ionic contaminants and the regeneration of the electrodes take place in the same cell and are mutually exclusive processes.

BRIEF SUMMARY

Embodiments disclosed herein include methods of removing contaminants from a solution, and related systems. For example, in accordance with one embodiment, a method of removing contaminants from a solution comprises passing a solution including one or more contaminants through a first cell comprising a first anode chamber and a first cathode chamber, passing a slurry comprising a flowing electrode material through the first anode chamber and the first cathode chamber while applying an electric potential between the first anode chamber and the first cathode chamber to transport anions from the solution to the first anode chamber and to transport cations from the solution to the first cathode chamber and remove the one or more contaminants from the solution, the flowing electrode material comprising a MXene material, wherein M is a metal and X is one or both of carbon and nitrogen, and passing the slurry through a second cell to desorb the anions and cations from the flowing electrode material.

Additional embodiments are directed to a system for removing one or more contaminants from a solution comprising a first cell comprising a first anode chamber electrically coupled to a first cathode chamber, a flow channel between the first anode chamber and the first cathode chamber, a second cell comprising a second anode chamber and a second cathode chamber, a first electrode flow circuit comprising a flowing electrode material comprising a MXene material connecting the first anode chamber and the second cathode chamber, wherein M is a metal and X is one or both of carbon and nitrogen, and a second electrode flow circuit comprising the flowing electrode material connecting the first cathode chamber to the second anode chamber.

In accordance with additional embodiments of the disclosure, a method of removing contaminants from a solution comprises flowing a solution including contaminants therein through a first flow channel between a first pair of electrodes in a first cell, flowing a slurry comprising a flowing electrode material comprising particles of a two-dimensional material through the first pair of electrodes to adsorb the contaminants from the solution onto the flowing electrode material, and flowing the slurry through a second flow channel between a second pair of electrodes in a second cell to regenerate the flowing electrode material.

DETAILED DESCRIPTION

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, system, or method for removing contaminants from a material. Only those process acts and structures necessary to understand the embodiments of the disclosure are described in detail below. Additional acts to remove contaminants from a material may be performed by conventional techniques. Further, any drawings accompanying the present application are for illustrative purposes only and, thus, are not drawn to scale. Additionally, elements common between figures may retain the same numerical designation.

According to embodiments described herein, a method of removing one or more contaminants (impurities) from a solution includes flowing the solution through a flowing electrode capacitive deionization (FE-CDI) system. In some embodiments, the system comprises a dual cell capacitive deionization system. The system includes a first cell separated from a second cell, the first cell including a first flow channel between a first anode chamber and a first cathode chamber and the second cell including a second flow channel between a second anode chamber and a second cathode chamber. A first anion exchange membrane may be between the first anode chamber and the first flow channel and a first cation exchange membrane may be between the first cathode chamber and the first flow channel. A second cation exchange membrane is between the second anode chamber and the second flow channel and a second anion exchange membrane is between the second cathode chamber and the second flow channel. A first slurry comprising a flowing electrode material dispersed in a solution is circulated in a first flowing electrode circuit connecting the first anode chamber with the second anode chamber. A second slurry comprising the flowing electrode material dispersed in another solution is circulated in a second flowing electrode circuit connecting the first cathode chamber with the second cathode chamber.

A solution including one or more impurities is passed through the first cell in the first flow channel while an electric potential is applied between the first anode chamber and the first cathode chamber. As the solution passes through the first flow channel, the first slurry and the second slurry are flowed through the respective first flowing electrode circuit and the second flowing electrode circuit. Responsive to the electric potential, anions and cations within the solution are transferred through the respective anion exchange membrane and cation exchange membrane and adsorbed onto the flowing electrode material in the first cathode chamber and the first anode chamber. As the solution passes through the first flow channel, contaminants are adsorbed therefrom and a purified material is formed.

The first slurry in the first flowing electrode circuit and the second slurry in the second flowing electrode circuit are loaded with adsorbed ions in the first cell. Thus, the flowing electrode material of each of the first flowing electrode circuit and the second flowing electrode circuit are loaded with ions of the solution in the first cell. The slurries are flowed to the second cell, where an electric potential is applied between the second anode chamber and the second cathode chamber to desorb the ions from the flowing electrode material of the slurries and regenerate the flowing electrode material prior to circulating back to the first cell. In other words, in the second cell, the loaded flowing electrode material of each of the first flowing electrode circuit and the second flowing electrode circuit loaded is regenerated and the ions are separated from the flowing electrode materials. Accordingly, separation of the first cell from the second cell may facilitate concurrent removal of impurities from the solution to adsorb ions onto the flowing electrode material and regeneration of the loaded flowing electrode material, facilitating continuous operation of the flowing electrode capacitive deionization system. The methods and systems provide advantages over conventional methods of purification. For example, the methods and systems do not require separate cycles for loading the electrode materials with contaminants followed by a separate stripping cycle to regenerate the electrode materials. Rather, the flowing electrode material is loaded with contaminants from the solution concurrently with stripping of the loaded flowing electrode materials in the continuous system.

Figure 1:
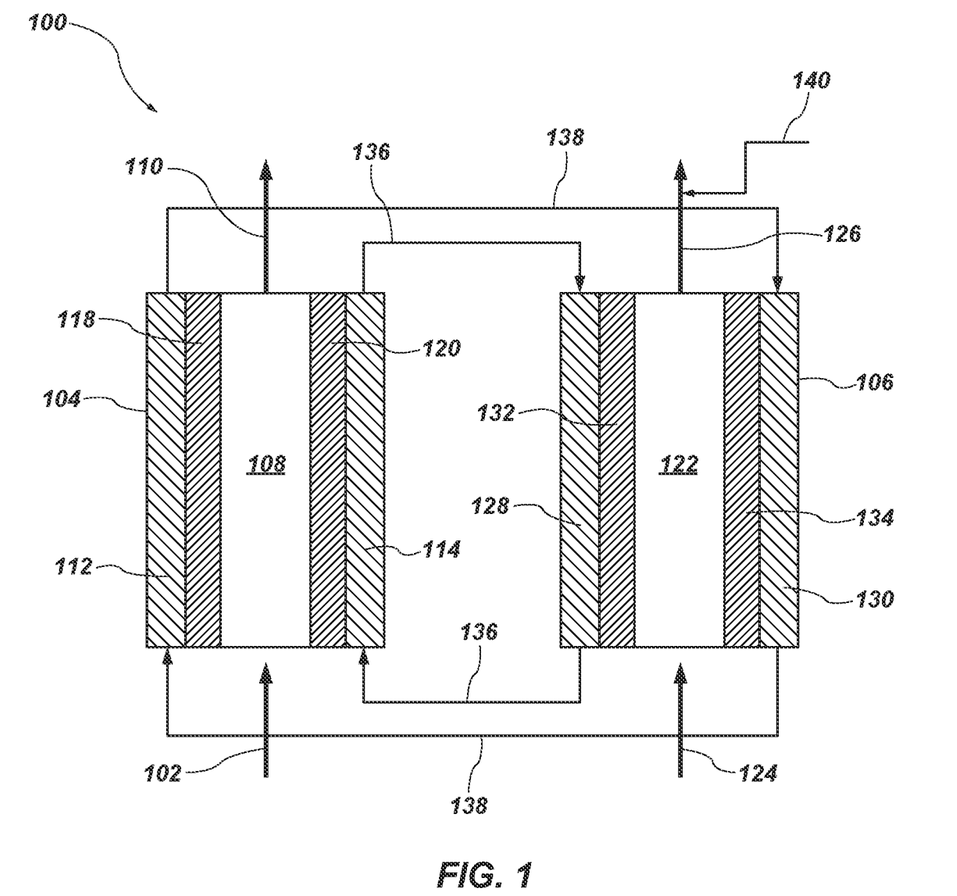
FIG. 1 is a simplified schematic of a system for purifying a solution, in accordance with embodiments of the disclosure.

FIG. 1 is a simplified schematic illustrating a system 100 for purifying a solution 102, in accordance with embodiments of the disclosure. In some embodiments, the system 100 comprises a flowing electrode capacitive deionization system, which may also be referred to as a flow-electrode capacitive deionization (FCDI) (also FE-CDI) system.

The solution 102 may comprise an ionic solution, a salt solution, or another solution including one or more contaminants (e.g., heavy metals, such as mercury, cadmium, arsenic, chromium, thallium, lead, antimony, cobalt, nickel, selenium, zinc, tin, copper, or other metals). In some embodiments, the solution 102 comprises ammonia-containing wastewater. For example, the solution 102 may include wastewater from refining operations. In other embodiments, the solution 102 comprises brackish water, such as seawater or a brine solution.

The system 100 may comprise a first cell 104 and a second cell 106 fluidly separated from the first cell 104 (except as described below with respect to a first flowing electrode circuit 136 and a second flowing electrode circuit 138). The first cell 104 may be referred to herein as an adsorption cell since contaminants within the solution 102 may be adsorbed onto a flowing electrode material. The second cell 106 may be referred to herein as a stripping cell since the adsorbed contaminants on the flowing electrode material may be effectively stripped from the flowing electrode material within the second cell 106. The solution 102 may flow through a first flow channel 108 within the first cell 104 and one or more contaminants may be removed from the solution 102 as the solution 102 flows through the first flow channel 108 to form a purified material 110. In some embodiments, the purified material 110 comprises desalinated water or deionized water. By way of nonlimiting example, the purified material 110 may comprise less than about 1 ppm of one or more contaminants (e.g., less than about 1 ppm of salt, ammonia, heavy metals, etc.).

The first cell 104 includes a first electrode pair comprising a first cathode chamber 112 and a first anode chamber 114 through which a slurry comprising the flow electrode material (also referred to simply as an electrode) flows. A first cation exchange membrane 118 may be in contact with the first cathode chamber 112 and may be located between the first cathode chamber 112 and the first flow channel 108. A first anion exchange membrane 120 may be in contact with the first anode chamber 114 and may be located between the first anode chamber 114 and the first flow channel 108.

The first cation exchange membrane 118 may be formulated and configured to transfer cations from the solution 102 in the first flow channel 108 to the first cathode chamber 112 including the flowing electrode material. In some embodiments, the first cation exchange membrane 118 is substantially impermeable to anions. By way of nonlimiting example, the first cation exchange membrane 118 may comprise a tetrafluoroethylene (PTFE) material incorporating sulfonate groups, such as Nafion (a sulfonated tetrafluoroethylene based fluoropolymer-copolymer) commercially available from Chemours Company of Wilmington, Delaware. In other embodiments, the first cation exchange membrane 118 comprises a polyethylene terephthalate (PET) reinforced membrane, such as those commercially available under the name of Fumasep® by the Fuel Cell Store of College Station, Texas. However, the disclosure is not so limited and the first cation exchange membrane 118 may comprise materials other than those described above.

The first anion exchange membrane 120 may be formulated and configured to transfer anions from the solution 102 in the first flow channel 108 to the first anode chamber 114 including the flowing electrode material. In some embodiments, the first anion exchange membrane 120 is substantially impermeable to cations. By way of nonlimiting example, the first anion exchange membrane 120 may comprise Fumion or Fumasep® FAB or Fumasep® FAAC, commercially available from Fumatech of Bietigheim Bissingen, Germany. However, the disclosure is not so limited and the first anion exchange membrane 120 may comprise materials other than those described above.

With continued reference to FIG. 1, the second cell 106 may include a second flow channel 122 through which a stripping solution 124 flows and absorbs ions from the flowing electrode material to regenerate the flowing electrode material and form a concentrated solution 126 including the contaminants removed from the solution 102.

The second cell 106 includes a second electrode pair comprising a second cathode chamber 128 and a second anode chamber 130 through which flow electrode material flows from the first anode chamber 114 and the first cathode chamber 112, respectively. A second anion exchange membrane 132 may be in contact with the second cathode chamber 128 and a second cation exchange membrane 134 may be in contact with the second anode chamber 130. The second anion exchange membrane 132 in contact with the second cathode chamber 128 may comprise one or more of the materials described above with reference to the first anion exchange membrane 120. In some embodiments, the second anion exchange membrane 132 has the same material composition as the first anion exchange membrane 120. The second cation exchange membrane 134 may comprise one or more of the materials described above with reference to the first cation exchange membrane 118. In some embodiments, the second cation exchange membrane 134 has the same material composition as the first cation exchange membrane 118.

The system 100 may further include a first flowing electrode circuit 136 and a second flowing electrode circuit 138. In some embodiments, the first cell 104 is fluidly coupled to the second cell 106 by means of the first flowing electrode circuit 136 and the second flowing electrode circuit 138, but may otherwise be out of fluid communication with (e.g., fluidly separated from) the second cell 106. The first flowing electrode circuit 136 may circulate a first slurry including the flowing electrode material from the first cathode chamber 112 of the first cell 104 to the second anode chamber 130 of the second cell 106. The second flowing electrode circuit 138 may circulate a second slurry including the flowing electrode material from the first anode chamber 114 of the first cell 104 to the second cathode chamber 128 of the second cell 106. As will be described herein, the flowing electrode material may be loaded with ions in the first cell 104 and may be flowed to the second cell 106 where the adsorbed ions on the flowing electrode material are removed to regenerate the flowing electrode material of each of the first slurry and the second slurry. Accordingly, the only fluid communication between the first flow channel 108 of the first cell 104 and the second flow channel 122 of the second cell 106 may comprise the anions and cations transferred by means of adsorption and desorption from the flowing electrode material.

The first slurry and the second slurry may individually comprise a suspension comprising a flowing electrode material suspended in a solution and comprising a two-dimensional (2D) material formulated and configured to adsorb one or more contaminants from the solution 102. The solution may comprise, for example, water. The flowing electrode material may comprise a material formulated and configured to adsorb the anions and cations from the solution 102.

In some embodiments, the flowing electrode material comprises two-dimensional transition metal carbides, transition metal nitrides, or transition metal carbonitrides, such as MXene materials, wherein M is a metal and X is one or both of carbon and nitrogen. By way of nonlimiting example, the flowing electrode material may comprise a material having the formula $M_{(n+1)}X_n$ for single metal MXene materials, wherein M is a transition metal and X is carbon or nitrogen. In some embodiments, n is an integer, such as 1, 2, or 3 and the flowing electrode material comprises a material having the formula $M_2X$, $M_3X_2$, or $M_4X_3$, respectively. In other embodiments, such as where the flowing electrode comprises a mixed metal MXene material, the flowing electrode material may comprise a material having the formula $M'_2M''C_2$, $M'_2M''_2C_3$, or $M'_4M''C_4$, wherein M' and M'' are different metals, such as transition metals. In some embodiments, the flowing electrode material includes surface terminations, such as one or more of hydroxyl group, oxygen (a double bonded oxygen), chlorine, and fluorine. In some such embodiments, the MXene material may be represented by the general formula $M_{(n+1)}X_nT_x$, $M'_2M''C_2T_x$, $M'_2M''_2C_3T_x$, or $M'_4M''C_4T_x$ wherein T is the surface termination group (e.g., =O, —F, —Cl, —OH). In some embodiments, the MXene material comprises a divacancy MXene material, such as a MXene material with the formula $Mo_{1.33}CT_x$ or $W_{1.33}CT_x$, wherein T is a surface termination group. In some embodiments, the surface terminations include fluorine and hydroxyl groups. In other embodiments, the surface termination groups comprise one or both of hydroxyl groups and oxygen.

In some embodiments, the flowing electrode material includes n+1 layers of the one or more transition metals and n layers of the carbon and/or nitrogen. In some embodiments, a total spacing between neighboring repeating layers of the flowing electrode material (e.g., between a layer of the one or more transition metals and a neighboring layer of the one or more transition metals) may be within a range from about 4 Å to about 10 Å, such as from about 4 Å to about 6 Å, from about 6 Å to about 8 Å, or from about 8 Å to about 10 Å. In some embodiments, the spacing is about 4.40 Å. However, the disclosure is not so limited and the spacing may be different than that described.

The transition metal may include, for example, one or more of scandium, titanium, vanadium, chromium, manganese, iron, cobalt, nickel, yttrium, zirconium, niobium, molybdenum, ruthenium, rhodium, hafnium, tantalum, tungsten, osmium, or iridium. In some embodiments, the transition metal comprises one or more of titanium, vanadium, chromium, scandium, and niobium. In some embodiments, the transition metal comprises titanium. In other embodiments, the transition metal comprises vanadium.

By way of nonlimiting example, the flowing electrode material may comprise one or more of a titanium carbide ($Ti_3C_2$, $Ti_2C$), vanadium carbide ($V_2C$), chromium carbide ($Cr_2C$), scandium carbide ($Sc_2C$), or niobium carbide ($Nb_2C$). In some embodiments, the flowing electrode material comprises titanium carbide. In other embodiments, the flowing electrode material comprises vanadium carbide. In some embodiments, the flowing electrode material comprises a mixed metal MXene, such as, for example, $M'_2M''C_2T_x$, $M'_2M''_2C_3T_x$, or $M'_4M''C_4T_x$. In some embodiments, the flowing electrode material comprises a solid solution MXene material, such as, for example, $Ti_{(2-y)}Nb_yCT_x$, $Ti_{(2-y)}V_yCT_x$, and $V_{(2-y)}Nb_yCT_x$, wherein y is a number between 0 (e.g., about 0.01) and about 2 (e.g., about 1.99), and $T_x$ represents surface termination groups (e.g., =O, —F, —Cl, —OH). In some embodiments, the flowing electrode material comprises a divacancy MXene material, such as, for example, one or both of $Mo_{1.33}CT_x$ and $W_{1.33}CT_x$.

In some embodiments, the flowing electrode material comprises particles having a substantially plate-like shape. In other words, particles of the flowing electrode material may have (e.g., exhibit) a flake shape. Particles of the flowing electrode material may have a size (e.g., a particle size, such as a Stokes Diameter, as measured by dynamic light scattering or a length and/or width) within a range from about 2 μm to about 50 μm, such as from about 2 μm to about 10 μm, from about 10 μm to about 20 μm, from about 20 μm to about 40 μm, or from about 40 μm to about 50 μm. In some embodiments, the average hydrodynamic diameter of the flowing electrode material may be within a range from about 1.0 μm to about 10.0 μm, such as from about 1.0 μm to about 2.0 μm, from about 2.0 μm to about 5.0 μm, or from about 5.0 μm to about 10.0 μm. In some embodiments, the average hydrodynamic diameter of the flowing electrode material is within a range from about 1.0 μm to about 2.0 μm, such as about 1.2 μm. However, the disclosure is not so limited and the size of the flowing electrode material may be different than those described above.

A concentration of the flowing electrode material within the slurry may be within a range from about 0.01 weight percent to about 10.0 weight percent, such as from about 0.01 weight percent to about 0.1 weight percent, from about 0.1 weight percent to about 0.2 weight percent, from about 0.2 weight percent to about 0.5 weight percent, from about 0.5 weight percent to about 1.0 weight percent, from about 1.0 weight percent to about 1.5 weight percent, from about 1.5 weight percent to about 2.0 weight percent, from about 2.0 weight percent to about 5.0 weight percent, or from about 5.0 weight percent to about 10.0 weight percent. In some embodiments, the flowing electrode material within each of the first slurry and the second slurry may constitute from about 0.1 weight percent to about 1.0 weight percent of the respective slurry. However, the disclosure is not so limited and the concentration of the flowing electrode material within the slurries may be different than those described above.

In some embodiments, a viscosity of each the first slurry and the second slurry is individually within a range from about 1 centipoise (cP) to about 2.0 cP, such as from about 1.0 cP to about 1.2 cP, from about 1.2 cP to about 1.4 cP, from about 1.4 cP to about 1.6 cP, from about 1.6 cP to about 1.8 cP, or from about 1.8 cP to about 2.0 cP at 25° C. In some embodiments, the viscosity of the first slurry and the second slurry is individually about 1.4 cP at about 25° C.

In some embodiments, the flowing electrode material in the first flowing electrode circuit 136 has the same material composition as the flowing electrode material in the second flowing electrode circuit 138. In other embodiments, the flowing electrode material in the first flowing electrode circuit 136 has a different material composition than the flowing electrode material in the second flowing electrode circuit 138.

In use and operation, the solution 102 including one or more contaminants is introduced into the first flow channel 108. An electric potential may be applied between the first cathode chamber 112 and the first anode chamber 114 of the first cell 104 to induce movement of cations within the solution 102 toward the first cathode chamber 112 and anions within the solution 102 toward the first anode chamber 114. For example, responsive to application of the electric potential between the first cathode chamber 112 and the first anode chamber 114, cations may flow from the solution 102 through the first cation exchange membrane 118 and into the first cathode chamber 112 where they are adsorbed onto surfaces of the flowing electrode material of the first slurry flowing through the first cathode chamber 112. Concurrently therewith, anions may flow from the solution 102 through the first anion exchange membrane 120 and into the first anode chamber 114 where they are adsorbed onto surfaces of the flowing electrode material of the second slurry flowing through the first anode chamber 114.

The electric potential may be within a range from about 0.5 V to about 2.0, such as from about 0.5 V to about 0.6 V, from about 0.6 V to about 0.8 V, from about 0.8 V to about 1.0 V, from about 1.0 V to about 1.2 V, from about 1.2 V to about 1.5 V, or from about 1.5 V to about 2.0 V. In some embodiments, the electrical potential has a magnitude less than a voltage at which water is electrolyzed, such as less than about 1.23 V. In some embodiments, the electric potential is about 1.2 V. In other embodiments, the kinetic rate of electrolysis of water at voltages greater than about 1.23 V is relatively low and the electric potential may be greater than about 1.23 V. However, the disclosure is not so limited and the electric potential may be different than those described above.

In some embodiments, such as where the solution 102 comprises ammonia-containing wastewater, the cations comprise ammonium ($NH_4^+$). In other embodiments, such as where the solution 102 comprises heavy metals, the cations include ions of heavy metals. In yet other embodiments, such as where the solution 102 comprises a salt solution (e.g., seawater, brackish water), the cations comprise sodium and the anions comprise chloride.

Removal of the anions and cations from the solution 102 may form the purified material 110. In some embodiments, the purified material 110 comprises less than about 1 ppm of the contaminants of the solution 102, such as less than 1 ppm of the ions. In some embodiments, the purified material 110 comprises less than about 1 ppm ammonia, less than about 1 ppm salt, or less than about 1 ppm of heavy metals.

With continued reference to FIG. 1, the flowing electrode material of the first slurry within the first flowing electrode circuit 136 may be loaded with anions as the solution 102 passes through the first flow channel 108. The first slurry may circulate from the first anode chamber 114 to the second cathode chamber 128 of the second cell 106. In the second cathode chamber 128, the anions loaded on the flowing electrode material may transfer through the second anion exchange membrane 132 and into the second flow channel 122 to regenerate the flowing electrode material in the first flowing electrode circuit 136. In other words, the flowing electrode material may be regenerated as it passes through the second cathode chamber 128 of the second cell 106. The first slurry comprising the regenerated flowing electrode material may be circulated back to the first cell 104 and proximate the first anode chamber 114 to repeat the process and load the flowing electrode material with the anions passing through the first anion exchange membrane 120 from the first flow channel 108.

The flowing electrode of the second slurry within the second flowing electrode circuit 138 may be loaded with cations as the solution 102 passes through the first flow channel 108. The second slurry may circulate from the first cathode chamber 112 to the second anode chamber 130 of the second cell 106. In the second anode chamber 130, the cations loaded on the flowing electrode material may transfer through the second cation exchange membrane 134 and pass into the second flow channel 122 to regenerate the flowing electrode material in the second flowing electrode circuit 138. In other words, the flowing electrode material may be regenerated as it passes through the second anode chamber 130 of the second cell 106. The second slurry comprising the regenerated flowing electrode material may be circulated back to the first cell 104 and proximate the first cathode chamber 112 to repeat the process and load the flowing electrode material with the cations passing through the first cation exchange membrane 118 from the first flow channel 108.

In some embodiments, an electric potential is applied between the second cathode chamber 128 and the second anode chamber 130 of the second cell 106 to drive the respective anions and cations from the flow electrode material to the second flow channel 122. The electric potential may exhibit an opposite polarity as the electric potential applied between the first cathode chamber 112 and the first anode chamber 114 and the magnitude of the electric potential may be the same as those described above with reference to the electric potential applied between the first cathode chamber 112 and the first anode chamber 114. In some embodiments, the electric potential between the second cathode chamber 128 and the second anode chamber 130 may have substantially the same magnitude and the opposite polarity as the electric potential applied between the first cathode chamber 112 and the first anode chamber 114. In some embodiments, the electric potential between the second cathode chamber 128 and the second anode chamber 130 may be within a range from about 0 V to about 1.2 V. In other embodiments, the anions and cations from the loaded flowing electrode material may be removed therefrom spontaneously due to the separation of the anions and the cations in the second cell 106. Stated another way, the relatively lower concentration of anions and cations in the stripping solution 124 of the second flow channel 122 relative to the concentration of the anions in the second cathode chamber 128 and the concentration of the cations in the second anode chamber 130 may provide a driving force for transfer of the anions and cations from the respective second cathode chamber 128 and second anode chamber 130.

The anions and cations driven into the second flow channel 122 are removed from the system 100 by the stripping solution 124 to form the concentrated solution 126. The stripping solution 124 may include any solution into which the anions from the flowing electrode of the second cathode chamber 128 and cations from the flowing electrode of the second anode chamber 130 may be dissolved. In some embodiments, the stripping solution 124 comprises water. In other embodiments, stripping solution includes one or more of an alkali hydroxide (e.g., lithium hydroxide (LiOH), sodium hydroxide (NaOH), potassium hydroxide (KOH) rubidium hydroxide (RbOH), cesium hydroxide (CsOH)), magnesium hydroxide ($Mg(OH)_2$), calcium hydroxide ($Ca(OH)_2$), and strontium hydroxide ($Sr(OH)_2$).

In some embodiments, the stripping solution 124 comprises water and the concentrated solution 126 comprises ions that were present in the solution 102. In some embodiments, the concentrated solution 126 comprises concentrated ammonium. In such embodiments, a solution 140 may be mixed with the concentrated solution 126 to remove (e.g., precipitate) the contaminant. In some embodiments, the solution 140 comprises a hydroxide, which reacts with the concentrated solution 126 and forms ammonia.

The concentrated solution 126 may include a concentrated amount of dissolved ions that were present in the solution 102. In some embodiments, the concentrated solution 126 may be used for energy recovery, such as in a fuel cell, conversion into hydrogen gas, or other treatment method.

In some embodiments, a flow rate of the solution 102 may be from about 1 time to about 100 times a flow rate of the stripping solution 124, such as from about 1 time to about 5 times, from about 5 times to about 10 times, from about 10 times to about 25 times, from about 25 times to about 50 times, from about 50 times to about 75 times, or from about 75 times to about 100 times the flow rate of the stripping solution 124.

The system 100 may facilitate removal of impurities from solutions 102 having a concentration of impurities within a range from about greater than about 1 ppm to about 1.0 M. However, the disclosure is not so limited and the system 100 may be configured to purify solutions 102 having a greater concentration of impurities than the concentrations described above.

Accordingly, the system 100 may be configured to continuously remove contaminants from the solution 102 and absorb the contaminants on the flowing electrode material within the first cell 104 to load the flowing electrode material within the first cell 104 with ions and cations while concurrently regenerating the loaded flowing electrode material in the second cell 106. In other words, by separating the first flow channel 108 from which the contaminants in the solution 102 are removed and loaded onto the flowing electrode material from the second flow channel 122 from which the loaded flowing electrode material is regenerated, the system 100 may continuously remove the contaminants from the solution 102. Stated another way, contaminants may be removed from the solution 102 to load the flowing electrode material in the first cell 104 while simultaneously regenerating the flowing electrode material in the second cell 106. By way of comparison, conventional capacitive deionization systems include fixed (stationary) electrodes that require regeneration after they become loaded with the contaminants. However, regeneration of electrodes in conventional CDI systems requires stopping a flow of the solution to be purified and flowing a stripping solution through the CDI cell to regenerate the electrodes. In addition, to reduce the risk of contamination, conventional CDI systems may require flowing one or more rinsing solutions through the CDI cell between cycles of loading the electrodes and stripping the loaded electrodes. The system 100 and method disclosed herein does not require separate adsorption cycles and stripping/regeneration cycles, along with rinsing cycles, as required in conventional CDI systems.

In addition, conventional CDI systems require significant numbers of adsorption and regeneration cycles when the solution 102 includes a relatively high concentration of contaminants. By way of contrast, the system 100 may remove contaminants from solutions 102 including high concentrations of contaminants by, for example, increasing the contact time between the flowing electrode material and the solution 102 (such as by decreasing the flow rate of the slurry), increasing the concentration of the flowing electrode material in the slurry, and increasing a surface area of the contact between the flowing electrode material and the solution 102 (e.g., increasing the surface area of the anion exchange membranes and the cation exchange membranes).

The use of the flowing electrode materials described herein facilitates reduction in the amount of the flowing electrode materials for removal of a particular amount of contaminants compared to conventional electrode materials such as activated carbon. Accordingly, the flowing electrode materials described herein may remove more contaminants than conventional electrode materials. In addition, use of the flowing electrode materials described herein facilitates use of a desired amount of the flowing electrode material (which, in turn, facilitates more efficient and/or effective removal of the contaminants) without being limited to the surface of an electrode substrate as in conventional CDI systems.

Accordingly, in some embodiments, contaminants may be removed from the solution 102 by using the system 100 including the first cell 104 that is fluidly isolated from the second cell 106. In other words, the solution 102 to be purified is out of fluid communication with the stripping solution 124 (except through the flowing electrode materials of the first flowing electrode circuit 136 and the second flowing electrode circuit 138). The contaminants that are adsorbed onto the flowing electrode material within the first cell 104 are removed and captured in the second cell 106 by means of the flowing electrode materials in the first flowing electrode circuit 136 and the second flowing electrode circuit 138. The continuous flow of the flowing electrode materials facilitates continuous removal of contaminants from the solution 102 without requiring separate loading and reservation cycles for the flowing electrode materials.

EXAMPLE

The removal efficiency of a flowing electrode material comprising $Ti_3C_2T_x$ was compared to the removal efficiency of activated carbon, wherein $T_x$ represents terminal groups of the $Ti_3C_2$ MXene material, as described above. Each of the $Ti_3C_2T_x$ and the activated carbon were used as a flowing electrode material in a single cell flowing electrode capacitive deionization cell. The cell including the $Ti_3C_2T_x$ flowing electrode material and the cell including the activated carbon flowing electrode material were substantially the same other than the composition and weight percent of the flowing electrode material in the flowing electrode slurries of the respective cells. The cells each included opposing current collectors comprising titanium and serpentine flow channels for the flow of a slurry comprising the flowing electrode material. The current collectors were separated by a layer of vitreous (glassy) carbon adjacent to one of the current collectors, a carbon cloth, a rubber gasket, an anion exchange membrane, a spacer, a polyester filter felt, a cation exchange membrane, another rubber gasket, another carbon cloth, and another layer of vitreous carbon adjacent to the other current collector. The spacer and the polyester filter paper allowed for a feed solution to pass therethrough and from one side of the cell (e.g., one current collector) to the other side of the cell (e.g., to the other current collector). The effective contact area of the cell was about 10 cm$^2$.

A total of about 20 ml of a feed solution comprising about 0.5 g/L $NH_4Cl$ was introduced into each cell at a rate of about 2 ml/min. The cell including the $Ti_3C_2T_x$ flowing electrode material included about 1 mg $Ti_3C_2T_x$ per ml slurry within the flowing electrode slurry of each current collector and the cell including the activated carbon included about 10 weight percent activated carbon within the flowing electrode slurry of each current collector. The flowing electrode slurries of each cell was circulated at a rate of about 3 ml/min and had a total volume of about 6 ml. In other words, in each cell, a first flowing electrode slurry was flowed through a first current collector at a rate of about 3 ml/min with a total volume of about 6 ml while a second flowing electrode slurry was flowed through the second current collector at a rate of about 3 ml/min with a total volume of about 6 ml. The cells were operated in batch mode including one cycle for loading the flowing electrode material with ions from the feed solution, followed by a second cycle for removing (e.g., stripping) ions from the loaded flowing electrode material. During the first cycle, a voltage of about 1.2 V was applied between the first current collector and the second current collector to drive cations of the feed solution (e.g., $NH_4^+$) through the cation exchange membrane and to the flowing electrode material of the current collector most proximate the cation exchange membrane and to drive anions of the feed solution (e.g., $Cl^-$) through the anion exchange membrane and to the flowing electrode material of the current collector most proximate the anion exchange membrane. After loading the flowing electrode materials, the polarity of the cell was reversed by applying a polarity of about −1.2 V between the current collectors to drive the cations and anions from the loaded flowing electrode material to a stripping solution flowed through the cell.

Figure 2:
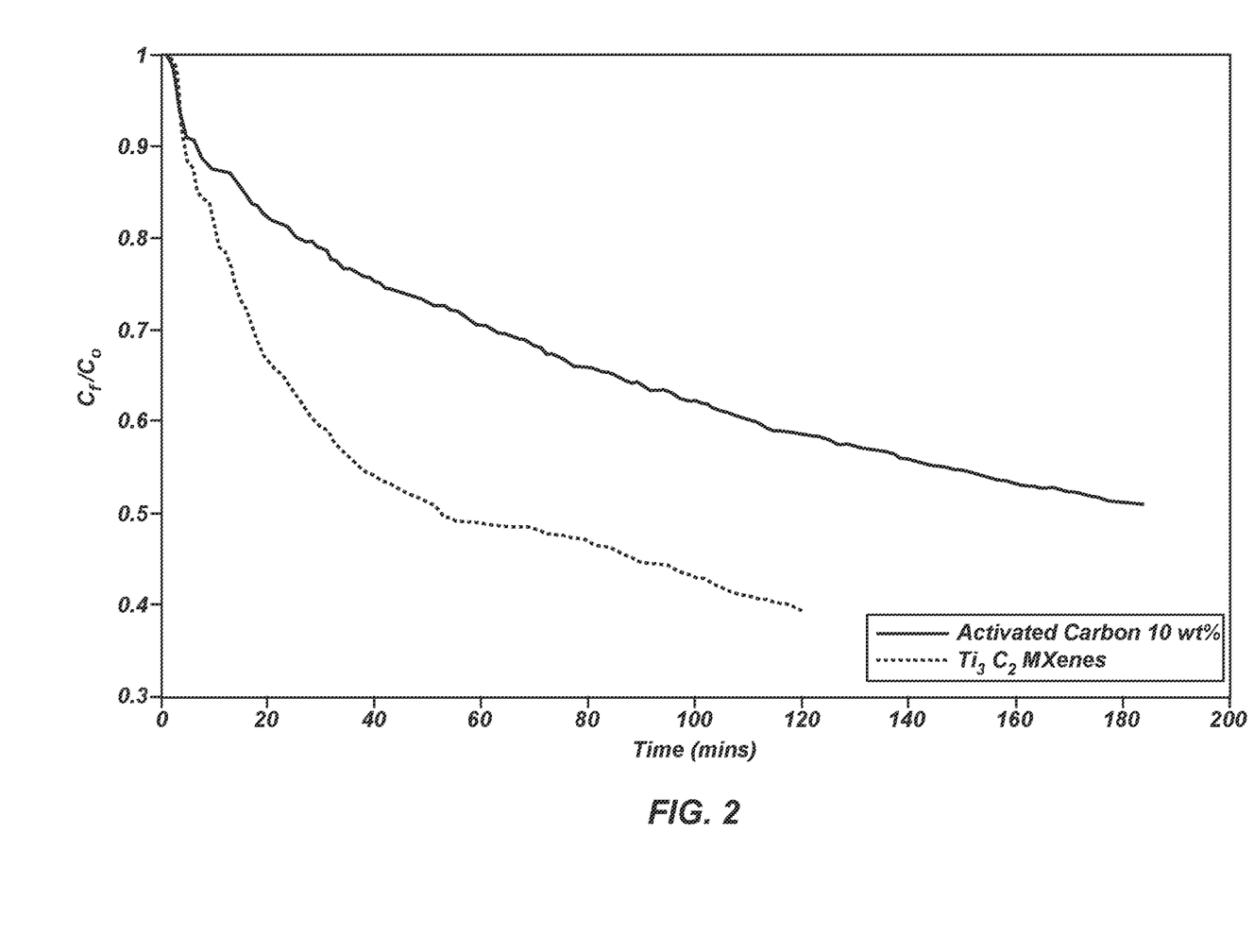
FIG. 2 is a graph illustrating the removal efficiency of a flowing electrode material comprising $Ti_3C_2T_x$ compared to the removal efficiency of a flowing electrode material comprising activated carbon.

FIG. 2 is a graph illustrating the removal efficiency of each of the $Ti_3C_2T_x$ and the activated carbon. In FIG. 2, $C_0$ represents the conductivity of the feed solution and $C_f$ represents the conductivity of the effluent. The ratio of $C_f/C_0$ is representative of the extent of ion capture from the ammonia-containing solution and the subsequent release of the ions from the flowing electrode materials during regeneration of the flowing electrode materials. A lower $C_f/C_0$ ratio indicates a relatively greater amount of removal of ions from the feed solution (corresponding to a decrease in conductivity of the effluent). As can be seen in the graph, even though the system including the $Ti_3C_2T_x$ flowing electrolyte included less than 0.1 weight percent of the flowing electrode material, the system including the $Ti_3C_2T_x$ flowing electrode material removed more than double the amount of ammonium as the flowing electrode material comprising activated carbon, which included about 10 weight percent (about 100 times more) of the flowing electrode material compared to the system including $Ti_3C_2T_x$.

Figure 3:
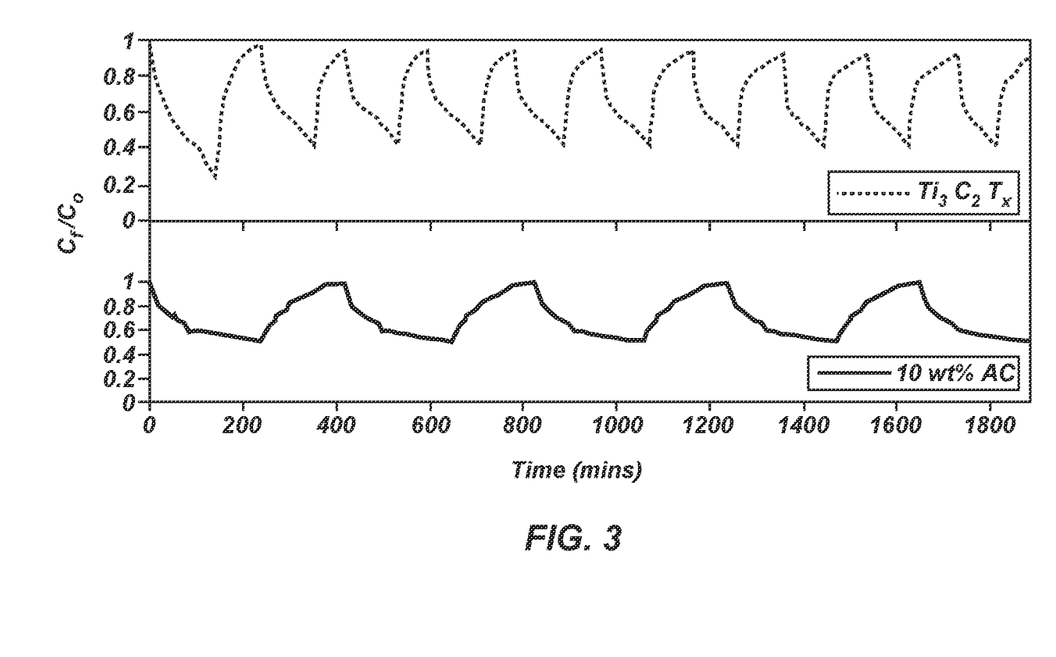
FIG. 3 is a graph illustrating the removal efficiency of the flowing electrode comprising $Ti_3C_2T_x$ compared to the removal efficiency of the flowing electrode material comprising activated carbon over several cycles.

FIG. 3 is a graph representing the ratio of the conductivity of the effluent solution relative to the conductivity of the original ammonia-containing solution, wherein $C_0$ and $C_f$ are the same as described above. As can be seen in the graph of FIG. 3, the saturation time of the $Ti_3C_2T_x$ flowing electrode material was about 115 minutes, significantly less than (e.g., nearly half as much as) the saturation time of about 223 minutes for the system including the activated carbon flowing electrode material. Accordingly, the flowing electrode material comprising $Ti_3C_2T_x$ exhibited shorter charge-discharge times relative to the flowing electrode material comprising activated carbon. Thus, over a 30-hour run time, the system including the $Ti_3C_2T_x$ flowing electrode material completed ten cycles, whereas the system including the activated carbon flowing electrode material only completed five cycles.

The average deionization capacity of the $Ti_3C_2T_x$ flowing electrode material was about 460 mg/g (meaning that the $Ti_3C_2T_x$ flowing electrode material removed about 460 mg of ammonium for every about one gram of the flowing electrode material), while the average deionization capacity of the activated carbon flowing electrode was about 4.2 mg/g, about two orders of magnitude less than the average deionization capacity of the $Ti_3C_2T_x$ flowing electrode material. The system including the $Ti_3C_2T_x$ flowing electrode material consumed about 0.45 kWh/kg of the processed ammonia-containing solution, significantly lower than the power required for conventional wastewater treatment.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of removing contaminants from a solution, the method comprising:
    passing a solution including one or more contaminants through a first cell comprising a first anode chamber and a first cathode chamber;
    passing a slurry comprising a suspension of a flowing electrode material suspended in an aqueous solution through the first anode chamber and the first cathode chamber while applying an electric potential between the first anode chamber and the first cathode chamber to transport anions from the solution to the first anode chamber and to transport cations from the solution to the first cathode chamber and remove the one or more contaminants from the solution, the flowing electrode material comprising a MXene material suspended in the aqueous solution, wherein M is a metal and X is one or both of carbon and nitrogen, and wherein the MXene material comprises n+1 layers of the metal and n layers of one or both of the carbon and nitrogen; and
    passing the slurry through a second cell to desorb the anions and cations from the flowing electrode material.

2. The method of claim 1, wherein transporting anions from the solution to the first anode chamber and transporting cations from the solution to the first cathode chamber comprises adsorbing the anions and the cations on the flowing electrode material.

3. The method of claim 1, wherein passing a solution including one or more contaminants through a first cell comprising a first anode chamber and a first cathode chamber comprises passing a solution comprising ammonia through the first cell.

4. The method of claim 1, wherein passing a slurry comprising a suspension of a flowing electrode material suspended in an aqueous solution through the first anode chamber and the first cathode chamber comprises passing the slurry comprising the suspension of the flowing electrode material comprising titanium carbide or vanadium carbide suspended in the aqueous solution through the first anode chamber and the first cathode chamber.

5. The method of claim 1, wherein passing a slurry comprising a suspension of a flowing electrode material suspended in an aqueous solution through the first anode chamber and the first cathode chamber comprises passing the slurry comprising a suspension of from about 0.01 weight percent to about 10.0 weight percent of the MXene material suspended in the aqueous solution through the first anode chamber and the first cathode chamber.

6. The method of claim 1, wherein passing a slurry comprising a suspension of a flowing electrode material suspended in an aqueous solution through the first anode chamber and the first cathode chamber comprises passing the slurry comprising the suspension of the flowing electrode material suspended in the aqueous solution through the first anode chamber having the same material composition as the flowing electrode material flowing through the first cathode chamber.

7. The method of claim 1, wherein passing the slurry through a second cell comprises passing the slurry through a second cell comprising a second anode chamber and a second cathode chamber while applying an electric potential between the second anode chamber and the second cathode chamber.

8. The method of claim 7, wherein applying an electric potential between the second anode chamber and the second cathode chamber comprises applying an electric potential having an opposite polarity as the electric potential applied between the first anode chamber and the first cathode chamber.

9. The method of claim 1, wherein passing the slurry through a second cell comprises passing the slurry through the second cell simultaneously with passing the slurry through the first anode chamber and the first cathode chamber.

10. The method of claim 1, further comprising flowing a stripping solution through the second cell while flowing the slurry through the second cell.

11. The method of claim 1, wherein passing a solution including one or more contaminants through a first cell comprising a first anode chamber and a first cathode chamber comprises passing a solution comprising heavy metals through the first cell.

12. The method of claim 1, wherein passing a solution including one or more contaminants through a first cell comprising a first anode chamber and a first cathode chamber comprises passing saltwater through the first cell.

13. The method of claim 1, wherein passing a slurry comprising a suspension of a flowing electrode material suspended in an aqueous solution through the first anode chamber and the first cathode chamber comprises passing a first slurry comprising a suspension of a first flowing electrode material suspended in a first aqueous solution through the first anode chamber and passing a second slurry comprising a suspension of a second flowing electrode material suspended in a second aqueous solution through the first cathode chamber, the second slurry physically isolated from the first slurry.

14. The method of claim 1, wherein passing a slurry comprising a suspension of a flowing electrode material suspended in an aqueous solution through the first anode chamber and the first cathode chamber comprises passing the slurry comprising the suspension of the flowing electrode material suspended in the aqueous solution comprising one or more surface termination groups selected from the group consisting of a hydroxyl group, oxygen, chlorine, and fluorine.

15. A method of removing contaminants from a solution, the method comprising:
flowing a solution including contaminants therein through a first flow channel between a first pair of electrodes in a first cell;
flowing a slurry comprising a suspension of a flowing electrode material comprising particles of a two dimensional MXene material suspended in an aqueous solution through the first pair of electrodes to adsorb the contaminants from the solution onto the flowing electrode material, wherein M is a metal and X is one or both of carbon and nitrogen, and wherein the two dimensional MXene material comprises one or more surface terminations comprising one or more of a hydroxyl group, oxygen, chlorine, and fluorine; and
flowing the slurry through a second flow channel between a second pair of electrodes in a second cell to regenerate the flowing electrode material.

16. The method of claim 15, wherein flowing a slurry comprising a suspension of a flowing electrode material comprising particles of a two dimensional MXene material suspended in an aqueous solution comprises flowing a slurry including particles of one or more of a transition metal carbide, a transition metal nitride, and a transition metal carbonitride suspended in the aqueous solution through the first pair of electrodes.

* * * * *

UNITED STATES PATENT AND TRADEMARK OFFICE
CERTIFICATE OF CORRECTION

PATENT NO. : 12,252,420 B2
APPLICATION NO. : 17/110487
DATED : March 18, 2025
INVENTOR(S) : Tedd E. Lister et al.

Page 1 of 1

It is certified that error appears in the above-identified patent and that said Letters Patent is hereby corrected as shown below:

In the Specification

Column 1,　　Line 18,　　change "DE-AC07-05-1D14517" to
　　　　　　　　　　　　-- DE-AC07-05-ID14517 --

Column 10,　　Lines 35-36,　change "potassium hydroxide (KOH) rubidium" to
　　　　　　　　　　　　-- potassium hydroxide (KOH), rubidium --

Signed and Sealed this
Second Day of September, 2025

Coke Morgan Stewart
*Acting Director of the United States Patent and Trademark Office*